Patented May 21, 1929.

1,713,677

UNITED STATES PATENT OFFICE.

KARL SCHUMPELT, OF PFORZHEIM, GERMANY, ASSIGNOR TO ERNST GIDEON BEK, OF PFORZHEIM, GERMANY.

PROCESS OF SOLDERING AND PRODUCT THEREOF.

No Drawing. Application filed October 9, 1926, Serial No. 140,670, and in Germany September, 1924.

This invention relates to soldering the adjoining surfaces of articles and is particularly advantageous in uniting the adjoining ends of the individual rings or links which constitute chains, bracelets, mesh bags and the like. Its purpose is to use a minimum amount of soldering material so that the metal of which the article is made should not be substantially adulterated therewith.

Thus, e. g., if a chain is made of copper, after it has been soldered according to this invention, the surfaces of the article will show copper and if made of gold the surface of the article will show gold.

It has been proposed heretofore to solder articles by electrolytically depositing at the joint and also on the surface thereof a substantial heavy covering of solder usually containing more than two metals and afterwards the deposit was melted by heating, resulting in the ends of the article being soldered together. The soldering material deposited on the surface of the article soldered thereto so that the article would have a complete covering of the solder material. This covering only would be observable and, therefore, in cases where the article was made of gold the covering would render it of less carat value. A further objection to articles made in such manner arose out of the fact that if it were attempted to treat them with the necessary chemicals, for preparation for subsequent plating with precious metals, the solder on the surface of the article would be removed therefrom and would adhere as a scum like film to the surfaces. It was, therefore, necessary to find special means of preparing such articles for plating, which special means were not entirely efficient.

It has been found, by the present invention, that articles may be strongly soldered by depositing an exceedingly small amount of solder upon the article and momentarily heating the soldering material to join the surfaces to be soldered together.

The exceedingly small amount of solder which it is suggested be used in carrying out this invention does not alone act to completely solder but through the application of heat the deposited soldering material and the surface metal of the article alloy and by their alloying action fill in the joint and by subsequent cooling unite the ends together. This alloy, because of the small amount of soldering material deposited thereon, is lost in the color of the predominating metal of the article.

Such solder as may adhere to the surface of the article is entirely taken up or absorbed by the metal of the article without substantially changing its metal value. It is advisable not to deposit more soldering material than .5% of the weight of the article. If as much soldier as 1% to the weight of the article is deposited thereon it will materially change the color of the article. The invention may be utilized in soldering articles made of copper, brass, or other copper alloys, gold and other metals. The soldering material in the case of copper, brass, and other copper alloys may be deposited upon the article by immersing it in a bath of silver salts. In instances where it is desirous of depositing the solder upon gold articles silver salts may likewise be utilized as a soldering material but are deposited electrolytically. It has been found that a single metal may be utilized as a soldering material to be deposited on the article in carrying out this invention and for all practical purposes silver salts have been found to be satisfactory.

The following two examples are given as illustrations of this invention:

Example 1.

A chain made of brass, the links of which have been interengaged is treated as follows:

1. Cleansed by dipping in a solution containing equal parts of nitric and sulfuric acid.
2. Washed in water.
3. Dipped in a solution of potassium cyanide.
4. Washed in hot water.
5. A solder bath is then prepared containing 35 grs. potassium argenticyanide $KAg(CN)_2$, 20 grs. potassium cyanide KCN and 1 liter of distilled water. This bath is heated and maintained just below the boiling point. The article is placed in the bath until the chain shows a white like appearance. It is not necessary, in this instance, to deposit the solder electrolytically inasmuch as the solder will adhere to the article by merely allowing it to lie therein. This nonuse of current for depositing purposes I refer to as autodeposition. An ample deposit is obtained in about one minute. In fact, the article will not take upon its surface more than a given amount of silver even though left in the bath for a longer period of time than one minute.

6. The article is removed from the solder bath and washed in warm water.

7. Dipped in a boiling solution (10 to 20%) of borax and water or other fluxing agent.

8. Allowed to dry.

9. Covered with graphite or other suitable covering which will avoid the fusion of the links together.

10. Heated to about 750° C. with a torch or the like so that the solder is brought to the melting point very quickly. The torch should be removed as soon as the solder is melted.

The article should be brought to the suggested temperature as quickly as possible inasmuch as slow heating will cause the applied soldering material to penetrate into the metal of the base and thereby would be totally lost.

11 The soldered article is then cleansed in a suitable manner and may then be plated, or treated otherwise.

*Example 2.*

A chain made of gold, the links of which have been interengaged is treated as follows:

The first four steps, which constitute the cleansing, are the same as given under Example 1.

5. A solder bath is then prepared containing 35 grs. potassium argenticyanide, $KAg(CN)_2$, 10 grs. potassium cyanide KCN and 1 liter of distilled water. This bath constitutes an electrolyte. The chain is hung in the bath and the solder material is deposited thereon electrolytically until about .5% of solder to the weight of the chain has been deposited thereon. This may be checked by observing the comparative weight of the chain before it goes into the bath and reweighing thereof periodically. It is not necessary to deposit as much as .5% of soldering material to the weight of the article inasmuch as soldering may be successfully accomplished with even less than this amount.

Steps 7, 8, 9, 10 and 11 in this instance are the same as the corresponding steps of Example 1.

It has been observed that when the links of the chain or the like are pressed together in the machine which forms them, the ends thereof do not contact throughout their entire surfaces but there are exceedingly small open spaces into which the solder will enter. In the subsequent heating operation this solder is melted and brings about soldering of the adjoining ends. In addition to this it has also been observed that some of the solder adjoining the joint flows into and over the joint and entirely covers it so that the place of union is not readily observable. There, apparently, is capillary action, during the heating operation, between the joint spaces and the deposited solder on the surface of the article.

When the right amount of solder is used the change of the color of the metal of the article is hardly observable. Brass, although it goes to the heating implement with a silver like color, returns to a copper like color after heating and gold, although before heating is covered with a silver like film, returns to substantially its gold color after heating.

I claim:

1. Process of soldering articles which consists in bringing the surfaces to be soldered together, depositing thereon, without the use of external electric current, such an amount of solder capable of being absorbed by the metal of the article, during the subsequent heating operation without substantially changing the color of the article, and finally heating the solder to cause it to melt and to be absorbed by the metal of the article.

2. Process of soldering articles which consists in bringing together the surfaces to be soldered and depositing on the article, without the use of external electric current, an amount of soldering material not in excess of 1% of the weight of the article and subsequently heating the solder to cause it to melt and to be absorbed by the metal of the article.

3. Process of soldering articles which consists in bringing together the surfaces to be soldered and autodepositing on the article, without the use of external electric current, an amount of soldering material not in excess of .5% of the weight of the article and subsequently heating the solder to cause it to melt.

4. Process of soldering articles made of copper or its alloy which consists in immersing the article in a bath containing soldering material, permitting the article to remain in the bath, to permit the autodeposit of solder thereon, without the use of external electric current, and subsequently heating the solder to cause it to melt.

5. The process of soldering metal chain which consists in preparing a bath containing silver salts only as the sole soldering agent, depositing the article to be soldered in the bath, permitting the deposit of soldering material thereon and subsequently heating the article to soften the solder.

6. The process of soldering articles which consists in preparing a bath containing as a soldering material only the salts of a single metal, depositing the article to be soldered in the bath, permitting the deposit of soldering material, without the use of external electric current, thereon and subsequently heating the article to soften the solder.

7. The process of soldering articles which consists in preparing a bath containing as a soldering material only silver salts, depositing the article to be soldered in the bath, permitting the deposit of soldering material, without the use of external electric current thereon and subsequently heating the article to soften the solder.

8. An article of manufacture comprising opposite surfaces soldered together with a single metal of a different character than the character of the metal constituting the article, all the surfaces of the article having distributed therein an exceedingly small amount of the soldering material but insufficient to change the color of the metal constituting the article.

9. The process of soldering metal chain made of brass which consists in preparing a bath containing silver only as the sole soldering agent, depositing the article to be soldered in said bath, permitting the deposit of soldering material on the chain, without the use of external electric current, and subsequently heating the chain to soften the solder.

In testimony whereof I have hereunto set my hand.

KARL SCHUMPELT.